United States Patent Office 3,661,884
Patented May 9, 1972

3,661,884
REFINING CRUDE AMORPHOUS POLYOLEFINS
Francis J. Shell and Norris D. Zetmeir, Bartlesville, Okla., assignors to Phillips Petroleum Company
No Drawing. Filed July 7, 1969, Ser. No. 839,676
Int. Cl. C08f 3/02, 3/08, 15/00
U.S. Cl. 260—93.7                    10 Claims

ABSTRACT OF THE DISCLOSURE

Crude amorphous polyolefins, by-products of polyolefin production, contain quantities of catalyst residues including discoloring agents such that the crude material is dark, highly viscous-to-solid, flammable and corrosive waste. By treating the crude product in a liquid two-phase purification process, the amorphous polyolefin is separated and recovered as a usable, safe-to-handle, essentially color free, material. The catalyst residue also is recovered.

---

This invention relates to methods of purifying crude amorphous polyolefins. It further relates to the separation of amorphous polyolefin from discoloring components and from catalyst residues.

Production of polyolefins is a multi-billion pound industry. Unfortunately, in the production of polyolefins, and particularly the polypropylenes, there appear varying amounts of a black sheep by-product: an unusable material, darkly discolored, usually highly viscous though at times even solid, extremely corrosive, and very flammable. This material is indeed a black sheep, being unwanted, unloved, and representing a waste of valuable raw materials. The amorphous noncrystalline by-product requires various methods of waste disposal, such as by burying which is both laborious and a waste of our shrinking land, or by burning which means dollars up in smoke plus undesirable atmospheric pollution.

The undesired crude amorphous polyolefins constitute up to about 15 percent of the total production of a polyolefin, depending on various process and operational factors, and catalyst usage. Further, such waste material contains large quantities of catalyst residues ranging in amount up to 25 percent, even sometimes as much as 34 percent.

This black sheep by-product is produced in all known polymerization processes of the olefins of from about 3 to about 8 carbon atoms. It is a noncrystalline polymer having a nonstereoregular structure formed during the stereo specific polymerization of the olefin or olefins. In the desired crystalline polymer with the so-termed isotactic structure, all substituents appear to have the same stereo chemical configurations, either d or l, and with geometrically repeating units. However, if the substituent groups are oriented in random fashion along the chain, the polymer is called amorphous, or, sometimes, atactic, and does not crystallize. Of course, some noncrystalline polymers are valuable, such as polystyrene.

The amorphous polyolefins are potentially valuable materials, once freed of contaminating agents and discoloring materials. The problem is economical and effective recovery. That is exactly what we have accomplished.

Our invention is a two-phase liquid separation process that provides a clean, usable, refined amorphous polyolefin, and, separately, recovered catalyst residue. The catalyst residue can be subjected to further treatment for ultimate reuse, if desired. The refined amorphous polyolefin is an emulsifiable material that finds ready use in many applications where a water-emulsifiable plastic material is desired. Not only is the cost of waste disposal avoided, but, instead, the purified product is itself profitable. And, by turning a waste by-product into a usable material, the overall basic costs of the isotactic crystalline polyolefins are reduced significantly.

Therefore, it is an object of our invention to recover usable refined amorphous polyolefins. It is a further object to separate catalyst residues from crude amorphous polyolefins. It also is an object of our invention to avoid further wastage of potentially valuable polymeric materials and catalytic materials. And, it is a basic object of our invention to accomplish these objectives with the minimum of handlings, steps, and further chemical requirements.

Other aspects, objects, and several advantages of our invention will be apparent to one skilled in the art from the following description and appended claims.

Our invention is a two-phase separation process, a two-liquid phase, specifically. The first phase consists of the crude amorphous polyolefin which has been treated to reduce its unhandy high viscosity at room temperature. The second phase, and the extractive phase relative to the catalyst residues, is a low molecular weight carbinol.

In the embodiment of our process wherein the first phase is the crude amorphous polyolefin only, such phase is heated slightly in order to reduce its viscosity prior to treatment with the second, or carbinol, phase. In another embodiment of our invention we avoid the necessity of utilizing a first heating step by reducing the viscosity of the crude amorphous polyolefin with a hydrocarbon so that the first phase consists essentially of the crude amorphous polyolefin plus a viscosity reducer; the second phase treatment then follows essentially the first embodiment described.

Since the production of polypropylenes presently represents the most commercially important process where crude amorphous polymer is a by-product, or description following is couched particularly in terms of polypropylene. However, this should not be limitative of our invention but only illustrative, since our invention is applicable to the polyolefins as we have delimited the class.

In a typical process, liquid propylene is contacted with a catalyst such as $TiCl_3 \cdot \frac{1}{3}AlCO_3$ plus diethyl aluminum chloride in about a 1 to 2 weight ratio typically, at a temperature in the area of about 130° F., a pressure of about 320 p.s.i.g., and a residence time in the reactor of the order of 2.5 hours. Productivity typically ranges from about 500 to 3000 pounds of polymer per pound of $TiCl_3 \cdot \frac{1}{3}AlCO_3$ catalyst.

The solid isotactic portion of the polypropylene polymerization product is separated from the amorphous polymer and catalyst residues by contacting in a wash column with materials such as liquid propylene containing acetyl acetone and propylene oxide. The latter two agents solubilize the amorphous material plus the catalyst residue, leaving the commercially useful isotactic material to be further treated. The crude amorphous material containing catalyst residues is separately recovered by removal of the solvents by any conventional method, such as flash vaporization. The solvents can be recovered and recycled, if desired.

The crude amorphous polyolefin, or in our specific example above the crude amorphous polypropylene, consists of the amorphous polyolefin as well as the catalyst residues, discoloring materials, and catalyst extraction agents. In general, the crude material contains anything that is soluble in the liquid extractants used to cleanse the isotactic material.

The amount of crude amorphous material usually will be in the area of about 4 to about 7 percent of the total polymer produced. However, in some instances, this can be as low as about 2 percent and as high as about 15 percent or more of the total polymer production.

The amount of catalyst residues, including extractants, in the crude amorphous material is typically about 5 weight percent based on the total crude amorphous material. However, this will vary with the different processes, and with productivity of the catalyst. A broad range of the total catalyst residues in the crude amorphous material can be from as low as 0.5 to about 25 weight percent. More rarely this may even extend as high as 34 weight percent.

The crude amorphous product is highly corrosive and hence is preferably handled in glass-lined equipment, or in stainless steel equipment suitable for very corrosive environments. Further, this material is highly flammable, and due safety precautions must be taken.

By our process, the amorphous polyolefin is separated from the residues at room temperature. The crude material is mixed with a viscosity reducing agent, preferably a hydrocarbon, at room temperature. Usually, little agitation is required for complete blending. This mixture, the first liquid phase, is then contacted with a low carbinol which forms a second liquid phase. The carbinol optionally can be a carbinol-water mixture such that the density of the mixture, the second liquid phase, is greater than that of the first liquid phase to effect good separation. The catalyst residues are soluble in the second liquid phase, and are extracted thereby.

Liquid-liquid phase separation then is employed, by decanting and the like. The separated first liquid phase is conducted to a separation means where the hydrocarbon viscosity reducing diluent is separated from the purified or refined polyolefin by means known to the art, such as by distillation or flash evaporation, and recovered for reuse if desired.

The separated second liquid phase also can be separately conducted to a recovery means, such as a distillation apparatus, and the lower carbinol then distilled off and, if desired, recovered for reuse. The residues of catalytic material can then be separately treated for subsequent reuse if desired, or otherwise disposed of.

The following Example I illustrates this first embodiment of our two-phase refining process.

EXAMPLE I

One thousand parts by weight of crude amorphous polypropylene were blended with 500 parts by weight of hexane at room temperature. This mixture was then contacted with 1000 parts by weight of methanol as the carbinol plus 50 parts by weight of water. Four succeeding extractions were made with the carbinol-water phase. The refined amorphous polypropylene-hexane-first-liquid-phase was separated from the carbinol-water-catalyst-residue-second-liquid-phase by draining off the lower or second phase. Eight hundred and eighty parts of refined amorphous polypropylene were recovered. The crude material was a very dark viscous unworkable material. The refined material was an essentially colorless material of approximately the color and easy handling consistency of good grade petrolatum.

Thus, by the use of our techniques, the crude material is refined at room temperatures and heating is unnecessary. While the purification of low residue-content crude polyolefins can be done in a single extraction with the second liquid phase, more usually two or more extractions are preferred to obtain a refined polyolefin of purest appearance. The carbinol second phases can be combined, if desired, for later distillation or other solvent recovery means.

Alternatively, the viscosity of the crude material can be reduced to a workable level by slightly heating the crude product, and omitting treatment with the viscosity reducing agent. Heating is applied to elevate the temperature of the crude material to about 130 to 150° F. This is not a critical range and higher temperatures can be used, if desired, as long as they are below the decomposition temperature of the product, and below the flash point of the still flammable crude material. There appears no necessity to ge beyond the moderate warming that results in a suitable viscosity reduction. The warmed crude material itself is the first liquid phase and is now sufficiently less viscous so as to be readily handled and stirred. This first liquid phase is extracted using a low carbinol, or a carbinol-water mixture, as the second liquid phase in the manner as described above in our first embodiment. Since the crude material is warm, it usually will be preferred to conduct the second phase extraction while using a reflux condenser or equivalent so as to conserve the carbinol which becomes more volatile at the warmer temperatures.

The following examples illustrate the results obtained in actual practice of this second embodiment of our invention.

EXAMPLE II

A weighed amount of dark brownish crude amorphous polypropylene (CAPP) was added to a glass-lined kettle and a measured amount of a carbinol was added. The particular carbinol, the relative amount of carbinol versus the amount of crude amorphous polypropylene, data as to reflux temperatures involved, and amount of recovered refined material are indicated in Table I which follows. Heat was applied and the mixture was refluxed at the boiling point of the particular carbinol used. In commercial operation, the heat can be applied separately to the crude amorphous polyolefin to produce the first liquid phase if desired. The glass-lined kettle was equipped with a motor-driven stirrer suitable to keep the two liquid phases well blended.

Time of reflux in each run shown in Table I was 30 minutes. At the end of this interval the refined material was allowed to cool to room temperature. The second liquid phase, consisting of carbinol plus catalyst residues, was separated and removed to a distillation apparatus for recovery of the carbinol. The refined amorphous plastic material (RAPP) was then heated to 5° C. above the reflux temperature to drive off any traces of remaining carbinol, and the carbinol-free material was then weighed as product.

TABLE I.—LIQUID-LIQUID EXTRACTION

| CAPP, parts [a] | Carbinol | | Reflux temp., ° C. | Carbinol-catalyst phase, Color | Recovered RAPP | | |
|---|---|---|---|---|---|---|---|
| | Name | Parts [a] | | | Parts [a] | Percent | Color |
| 1,500 | Methanol | [b] 1,000 | 63–78 | Red | 1,319 | 87 | Yellow: |
| 1,500 | do | 2,000 | 64 | Red | 1,167 | 77 | Do. |
| 1,500 | Propanol | 2,000 | 96–98 | Red | 935 | 62 | Do. |
| 1,500 | Isopropaol | 2,000 | 81–83 | Red | 1,026 | 68 | Do. |
| 1,500 | Water [c] | 2,000 | 98–100 | | None | 0 | |

[a] Parts by weight.
[b] Water added=1:1 methanol and water.
[c] Control run.

The two-phase extractions above were based on a single treatment with the second phase. While distinct improvement in the color of the recovered refined amorphous plastic (RAPP) is shown, the remaining coloration indicates that traces of catalyst residues still remained. Therefore, tests were made to determine whether a longer reflux time would be desirable, or whether successive extractions would be preferable, in order to produce as clean a refined product as possible.

EXAMPLE III

A weighed amount of crude amorphous polypropylene was poured into the glass-lined kettle and a measured amount of the carbinol added. The procedure in this Example III is the same as in the preceding Example II except that the reflux temperature was 63 to 65° C. for one hour. Separation procedures otherwise were the same. After the refined amorphous polypropylene was weighed, half of it was added back into the kettle. A measured amount of the carbinol was again added, and the extraction and recovery steps were repeated as before. Again the recovered refined material was dried to remove any remaining carbinol, and again weighed. Thus, the material was treated to two successive extractions. The results are shown in the following table:

In general, an essentially colorless refined amorphous polypropylene indicates a catalyst residue-free material.

The tests in the above table also show that the extractant carbinol can be recovered and reused without harm to the process.

The data in the several tables indicate that a single second phase extraction did not remove all the catalyst residue from the particularly high residue-content crude amorphous polypropylene we used in our runs even at a relatively high ratio of 20 parts of carbinol to one part of crude material. With crude products of lower catalyst

TABLE II.—LIQUID-LIQUID EXTRACTION

| | First extraction a | | | | Second extraction a | | | | |
|---|---|---|---|---|---|---|---|---|---|
| CAPP, Parts b | RAPP recovered | | Color | | RAPP,c Parts b | RAPP recovered | | Color | |
| | Parts b | Percent | Carbinol phase | RAPP | | Parts b | Percent | Carbinol phase | RAPP |
| 1,100 | 798 | 72 | Red | Yellow | 399 | 376 | 94 | Yellow | Yellow. |
| 1,000 | 715 | 72 | Red | do | 358 | 335 | 93 | do | Do. |
| 900 | 643 | 71 | Red | do | 326 | 296 | 90 | do | Do. |
| 800 | 570 | 71 | Red | do | 285 | 275 | 96 | do | Do. |
| 700 | 508 | 72 | Red | do | 254 | 353 | 95 | do | Do. |
| 600 | 428 | 71 | Red | do | 214 | 200 | 93 | do | Do. |
| 500 | 320 | 64 | Red | do | 160 | 150 | 93 | do | White.d |
| 400 | 298 | 75 | Red | do | 147 | 127 | 86 | do | Do.d |
| 300 | 244 | 81 | Red | do | 122 | 96 | 78 | do | Do.d |
| 200 | 147 | 73 | Red | do | 74 | 61 | 82 | do | Do.d |
| 100 | 67 | 67 | Red | do | 33 | 31 | 93 | do | Do.d | b Two thousand parts by weight of carbinol used in each extraction, thus giving a variation in CAPP to carbinol ratio.
b Parts by weight.
c One-half of the RAPP obtained from the first extraction was used for the second extraction.
d Contains no catalyst residue.

The results shown in the above Table II give direct comparison in the color of the finally recovered refined material as to effectiveness of the second extraction procedure, and, generally, indicate improvement in product as the amount of carbinol increased relative to the amount of crude material treated. Of course, such ratios may vary somewhat depending upon the amount of catalyst residue in the original crude material, which will vary considerably as we have discussed hereinabove, and the desired or required purity of the refined material.

EXAMPLE IV

Further successive tests were made using the same procedure as given in Example III above, except that instead of using only half of the material from the first extraction for the second extraction, all of the material from the first extraction was used in a second extraction with the carbinol. Reflux temperature was 63 to 65° C. for one hour with methanol as the carbinol. The results from two successive extractions are shown in the following table:

content, a singly extracted refined material would be suitable for some uses.

With crude products of appreciable catalyst residue content, the data indicate that at least two extractions would be preferable. Data in Table II also indicate that when two extractions are used, a white (i.e., purified) amorphous plastic was produced when the carbinol-to-crude ratio was 4:1 in the first extraction and the partially purified product from this first extraction was then extracted with 12.5 times its weight of carbinol. In Table III the ratios were held to 10:1 based on the original weight of crude product. The samples of crude material used were particularly high in catalyst residue, actually much higher than usual, approaching 34 to 35 percent residue. This shows the overall high effectiveness of our invention.

EXAMPLE V

The aforementioned crude polypropylene of particularly high residue-content was subjected to successive extractions. The procedure used was liquid-liquid extraction

TABLE III.—LIQUID-LIQUID EXTRACTION

| CAPP, parts a | First extraction carbinol, parts a | Carbinol-catalyst phase, color | Second extraction carbinol, parts a | Carbinol-catalyst phase, color | RAPP recovered | | |
|---|---|---|---|---|---|---|---|
| | | | | | Parts a | Percent | Color |
| 1,200 | 2,000 | Red | 4,000 | Yellow | 776 | 64 | Yellow. |
| 800 | 2,000 | Red | 2,000 | do | 543 | 67 | Do. |
| 500 | 2,000 | Red | 2,000 | do | 330 | 66 | Do. |
| 400 | 2,000 | Red | 2,000 | do | 278 | 69 | Pale yellow. |
| 300 | 2,000 | Red | 2,000 | do | 205 | 68 | Do. |
| 300 | 3,000 | Red | 3,000 | do | 200 | 66 | White.c |
| 300 | 3,000 | Red | 3,000 | do | 200 | 66 | Do.c |
| 300 | b 3,000 | Red | b 3,000 | do | 200 | 66 | Do.c | a Parts by weight.
b The carbinol used was distilled from previous extractions.
c Contains no catalyst residue.

wherein the crude or successively refined amorphous polypropylene constituted the first liquid phase, and methanol was the carbinol constituting the second liquid phase. Conditions for each extraction included reflux for approximately 30 minutes at the boiling point of the carbinol used, and the use of 3000 parts by weight of carbinol.

TABLE IV

| | Titanium, p.p.m. | Aluminum, p.p.m. | Acetylacetone, p.p.m. | Color |
|---|---|---|---|---|
| After one extraction [a] | 73 | 30 | 1,000 | Lemon yellow. |
| After second extraction [b] | 22 | 10 | 150 | Dull white. |
| After third extraction [c] | 2 | 10 | 20 | Clear white. |
| After fourth extraction [d] | 2 | 10 | 5 | Do. |
| After fifth extraction | 2 | 10 | 1 | Do. |
| After sixth extraction | 2 | 10 | 0.5 | Do. |

[a] 1,000 parts by weight of crude were used.
[b] The material remaining from the first extraction was used for the second extraction.
[c] A second amount of the same crude as used in (a) was subjected to two successive extractions, and 1,000 parts by weight of twice-extracted material were extracted for the third extraction.
[d] The material remaining from the third extraction was used in the fourth extraction, and similarly for the fifth and sixth successive extractions.

The data demonstrate that despite particularly high residue-content crude used as a starting material, that a single extraction according to a method of our invention produced a white product. Further extractions can be applied, if desired, depending on particular commercial end-use requirements of the refined material.

A commercial crystalline polypropylene prepared using the same catalyst type was analyzed and was found to contain 10 p.p.m. titanium, 10 p.p.m. aluminum, and 1 p.p.m. acetylacetone.

However, these values and all values in our examples are illustrative only and should not be limitative of our invention. Commercial requirements for purified or refined polyolefins are not likely to be necessary similar to requirements for crystalline polyolefins.

While our invention can be applied to advantage in its various aspects to polymers of olefins broadly, it is particularly useful in the recovery of polymers of α-olefins from a polymerization process using an organometallic catalyst system. Ordinarily these α-olefins will have from 3 to 8 carbon atoms per molecule, such as propylene, 1-butene, 1-pentene, 4-methyl-1-pentene, 3-methyl-1-butene, 3,3-dimethyl-1-butene, and the like.

Our invention also is applicable to the polymerization of these α-olefins where a comonomer polymerizable therewith is also used constituting as much as 25 percent by weight of the total monomers present. Such comonomers include ethylene as well as the vinyl and vinylidene monomers of up to about 12 carbon atoms and can include the vinyl substituted aromatics.

All of these α-olefin polymerizations and copolymerizations, in general, produce varying amounts of the presently unusable crude amorphous polyolefin. The polymerization of ethylene alone does not produce any appreciable amorphous fraction, apparently since there are no methyl or other groups to form substituents on the polymer chain.

In the organometallic catalyst polymerization systems, the catalyst includes a nontransition metal of Group I, II, or III of the periodic system; for example, aluminum, beryllium, zinc, magnesium, lithium, or sodium in which the metal is attached to at least one hydrocarbon radical and the remaining valences, if any, are satisfied by halogen or hydrogen. Complex alkyls of aluminum and alkali metals, for example, lithium aluminum tetrapropyl, are sometimes used.

Of these catalysts, usually preferred are the dialkylaluminum chlorides or bromides in which the alkyl radicals have from 1 to 8 carbon atoms. In the catalyst system, the organometal is used with a transition metal compound such as the halides of the Groups IV to VI metals, for example, titanium, vanadium, zirconium, hafnium, thorium, uranium, niobium, tantalum, chromium, molybdenum or tungsten. Of these, the chlorides of titanium are usually preferred, being used in a weight ratio of about 0.5:1 to about 20:1 $TiCl_3$ to such as dialkylaluminum halide.

Preferably, the polymerization is carried out in the liquid monomer although an inert diluent can be employed. Temperatures in the range of about 90 to 160° F. and residence times of about 1 to 15 hours are preferred for the polymerization of α-olefins.

In one of the embodiments of our invention, we mix a viscosity reducing agent with the crude amorphous material. We have avoided using the term solvent, since as to some useful agents, the term is not appropriate.

When we refer to a viscosity reducing agent, we refer to a material that will make the highly viscous even substantially solid crudes polyolefin thin enough to handle as a first liquid phase. We prefer paraffinic hydrocarbons, such as the pentanes, hexanes, heptanes, both n-, iso- and cyclic, of about 5 to 10 carbon atoms per molecule. These paraffinic hydrocarbons do not strictly dissolve the amorphous polyolefin, but rather form a first liquid phase which is a dispersion which will settle on long standing. Nevertheless, such materials form a first liquid phase that is uniform and quite usable in our invention, and readily separable by any means known to the art from the second liquid phase, the carbinol phase.

Other materials useful as viscosity reducing agents are the aryl hydrocarbons such as toluene, the xylenes, of up to about 12 carbon atoms per molecule; and the hydrocarbon fractions classified as the kerosenes, and as jet fuels. With all of these, it appears that essentially a true solution is formed with the amorphous polyolefin.

Whether solution or dispersion appears to be more academic than informative, however, as the difference here is one of degree, not of kind. In any event, the viscosity reducing agent should be essentially immiscible with the second liquid phase, i.e., the carbinol, and nonreactive therewith; and, of course, should either dissolve or readily disperse the amorphous polyolefin.

The amount of the viscosity reducing agent to be used will depend on the physical nature of the crude amorphous polyolefin and how thin a first liquid phase is desired. As little as 5 parts of viscosity reducing agent per 100 parts of crude polyolefin may be used, up to as much as 500:100 or more. Maximum economy in handling and recovery of material is obtained by using the minimum amount of such agent compatible with ease of handling the resulting first liquid phase. We have found a ratio of 200:100 to 80:100 parts by weight of agent to parts of crude polyolefin most usually suitable.

Formation of the first liquid phase preferably is at atmospheric pressure because of convenience. However, when using some of the lower hydrocarbons, such as the pentanes, use of elevated pressures are beneficial to maintain essentially liquid conditions and to avoid undue loss of the viscosity reducing agent.

The second liquid phase is formed with a lower carbinol. The carbinol should be one that dissolves out or removes the catalyst residues from the first liquid phase and should not form a solution with the first liquid phase, i.e., should essentially not be a solvent for either the viscosity reducing agent nor the amorphous polyolefin. To meet these requirements, we have found that only the lower carbinols of up to 3 carbon atoms are suitable, specifically methanol, ethanol, and the n- and iso-propanols. The butanols and higher carbinols begin to dissolve in or with the first liquid phase, resulting in a nonseparable mixture. The diols and polyols are not suitable in our process.

The ratio of carbonol to the first liquid phase will very over a wide range depending on the amount or concentration or porportion of catalyst residues contained in the first liquid phase; the degree or extent of free from catalyst residues desired in the final product; and whether one or two or more second liquid phase extraction steps are to be used.

We have found a range of parts by weight of carbinol to first liquid phase of from 200:3 to 200:300 to be useful, though the usual ratio will be within about 200:15 to 200:150.

It is not necessary for the viscosity reducing agent, if used, nor for the lower carbinol, to be anhydrous, nor for the extraction steps, one or more, nor the drying steps, to be conducted under anhydrous conditions. A small amount of water may even be added to or with the second liquid phase so as to affect, by increasing, the density of the second liquid phase to make it more easily separable from the first liquid phase.

Water, alone, can constitute the second liquid phase and will extract the catalyst residues provided that relatively high temperatures of extraction are maintained of above about 250° F. However, the product ultimately obtained, the refined amorphous polyolefin, is not the same as that obtained via our two-liquid phase extraction method. The refined amorphous polyolefin obtained via the water-alone extraction has a good appearance but, oddly, is not water emulsifiable.

The refined amorphous polyolefin obtained by our two-liquid phase extraction scheme not only has good water-white appearance and is soft to the consistency of good grade petroleum, but is, desirably, readily emulsifiable in water which we find beneficial for many end-use applications. It is apparent that it is desirably different in character from that produced via the water-alone extraction.

Therefore, we prefer not to use water alone as the second liquid phase and usually limit the water in the second liquid phase to not over about 50 weight percent; in fact, most preferably not adding any additional water at all. The minor few percent of water frequently found commonly associated with commercial grade carbinols are not objectionable. Of course, anhydrous or absolute grade carbinols can be used, if desired, though they are frequently more expensive.

The pH of the second liquid phase is not critical and there is no necessity to adjust the pH. Acidic, neutral, or alkaline conditions appear to be equally suitable. Of course, as we have said, the crude amorphous polyolefin is itself quite corrosive, and, because of this, the purification process preferably is conducted in glass-lined or similarly corrosion resistant equipment. Therefore, at times, adjustment of pH to moderately alkaline ranges of above 7 pH by addition of an alkali such as ammonia, sodium hydroxide, potassium carbonate, and the like, may be helpful from a corrosion standpoint, since this will not interfere with the process and method of purification according to our invention.

These examples show the operability of our invention. Reasonable variations and modifications are certainly possible and yet still within the scope of our disclosure, without departing from the scope and spirit thereof.

We claim:

1. A process for the purification of crude amorphous polyolefin containing catalyst residues and being one of the products of polymerization under polymerization conditions of an olefin containing up to about 8 carbon atoms, from 0 to about 25 weight percent of a comonomer copolymerizable therewith, and a polymerization catalyst, wherein said polymerization catalyst comprises a non-transition metal of Group I, II, or III of the periodic system in which said non-transition metal is attached to at least one hydrocarbon radical and the remaining valences are satisfied by halogen or hydrogen, together with a transition metal compound wherein said transition metal compound is a halide of Group IV, V, or VI of the Periodic Table, which comprises:

(a) contacting, at about ambient temperatures and under sufficient pressure to maintain essentially liquid conditions at said ambient temperatures, said crude amorphous polyolefin with a liquid viscosity reducing agent and thereby producing a mixture containing undissolved catalyst residues and a first liquid phase consisting substantially of dispersed amorphous polyolefin in said liquid viscosity reducing agent, wherein said liquid viscosity reducing agent is a hydrocarbon containing from about 5 to 12 carbon atoms, and wherein from about 5 to 500 parts by weight of said liquid viscosity reducing agent are used per 100 parts of said crude amorphous polyolefin, (b) contacting, at about ambient temperatures and under sufficient pressure to maintain essentially liquid conditions, said mixture from said step (a) with a non-aqueous carbinol containing from 1 to 3 carbon atoms per molecule and essentially insoluble in said mixture from said step (a) and in which said catalyst residues substantially dissolve, and thereby producing a second liquid phase of said catalyst residues substantially dissolved in said carbinol, and a substantially catalyst residue-free first liquid phase, and wherein are employed from about 200:3 to 200:300 parts by weight of said carbinol to said first liquid phase, (c) separating said substantially catalyst residue-free first liquid phase from said second liquid phase, (d) separating, from said substantially catalyst residue-free first liquid phase, said liquid viscosity reducing agent and recovering now-purified amorphous polyolefin as a substantially water emulsifiable product.

2. The process of claim 1 wherein said step (d) is followed by:

(e) recycling said liquid viscosity reducing agent from said step (d) to said step (a), (f) recovering said carbinal from said second liquid phase separated in said step (c), and (g) recycling said recovered carbinol to said step (b).

3. The process of claim 1 wherein from about 200 to 80 parts by weight of said hydrocarbon are used per 100 parts of said crude amorphous polyolefin.

4. The process of claim 3 wherein from about 200:15 to 200:150 parts by weight of said carbinol are used to said first liquid phase.

5. The process of claim 4 wherein in step (b) said carbinol is an admixture of carbinol and a minor amount of water such that said second liquid phase has a density greater than that of said first liquid phase.

6. The process of claim 4 wherein said polyolefin is a polypropylene, said hydrocarbon is selected from pentanes, hexanes, and heptanes, and said carbinol is methanol or ethanol, and wherein said catalyst is a dialkylaluminum halide with a chloride of titanium.

7. The process of claim 1 wherein said contacting step (b) further includes use of a sufficient amount of an alkaline material selected from at least one of alkali hydroxides, ammonium hydroxide, ammonia, and alkali carbonates, to maintain the pH of said second liquid phase above 7.

8. A process for the purification of crude amorphous polyolefin containing catalyst residues and being a product of polymerization under polymerization conditions of an olefin containing up to about 8 carbon atoms, from 0 to about 25 weight percent of a comonomer copolymerizable therewith, and a polymerization catalyst, wherein said polymerization catalyst comprises a non-transition metal of Group I, II, or III of the periodic system in which said metal is attached to at least one hydrocarbon radical and the remaining valences are satisfied by halogen or hydrogen, together with a transition metal compound wherein said transition metal compound is a halide of Group IV, V, or VI of the Periodic Table, which comprises:

(a) heating said crude amorphous polyolefin at least to a temperature sufficient to convert said crude amorphous polyolefin to a substantially liquid condition, and thereby producing a first liquid phase consisting of substantially undissolved catalyst residuces dispersed in now liquefied crude amorphous polyolefin, (b) contacting, at said temperatures and under sufficient pressure to maintain essentially liquid conditions, said mixture from said step (a) with a non-aqueous carbinol containing from 1 to 3 carbon atoms per molecule and essentially insoluble in said mixture from said step (a) and in which said catalyst residues substantially dissolve, and thereby producing a second liquid phase of said catalyst residues substantially dissolved in said carbinol, and a substantially catalyst residue-free first liquid phase, and wherein are employed from about 200:3 to 200:300 parts by weight of said carbinol to said first liquid phase, (c) separating said substantially catalyst residue-free first liquid phase from said second liquid phase, (d) recovering said catalyst residue-free first liquid phase as a substantially water emulsifiable purified amorphous polyolefin.

9. The process of claim 8 wherein said heating is at a temperature of from about 130° F. to safely below the decomposition point of said polyolefin, and wherein said step (b) includes use of reflux to minimize loss of said carbinol.

10. The process of claim 9 wherein said steps (a) and (b) are conducted essentially simultaneously.

References Cited

UNITED STATES PATENTS

| | | | |
|---|---|---|---|
| 3,060,162 | 10/1962 | Van den Berg | 260—93.5 |
| 3,112,302 | 11/1963 | Kolling et al. | 260—94.9 |
| 3,141,009 | 7/1964 | Shuman | 260—88.2 |
| 3,219,622 | 11/1965 | Luciani et al. | 260—94.9 XR |
| 3,225,022 | 12/1965 | Andersen et al. | 260—94.9 |

JOSEPH L. SCHOFER, Primary Examiner

W. F. HAMROCK, Assistant Examiner

U.S. Cl. X.R.

260—88.2, 94.9 F